June 16, 1925.
H. W. FISHER ET AL
1,541,937
CABLE INSTALLATION
Original Filed July 3, 1920
FIG. I.
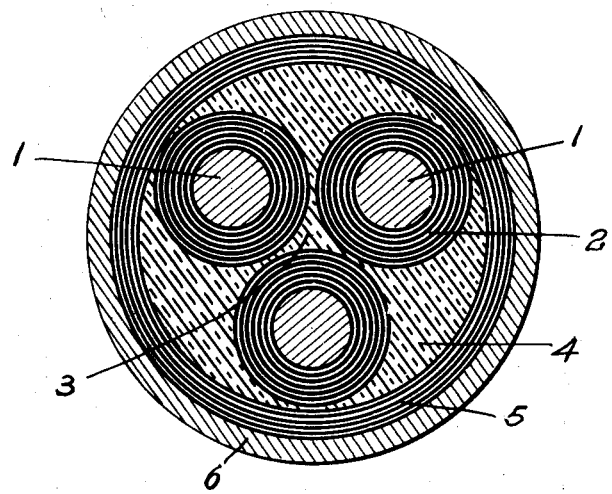
FIG. II.
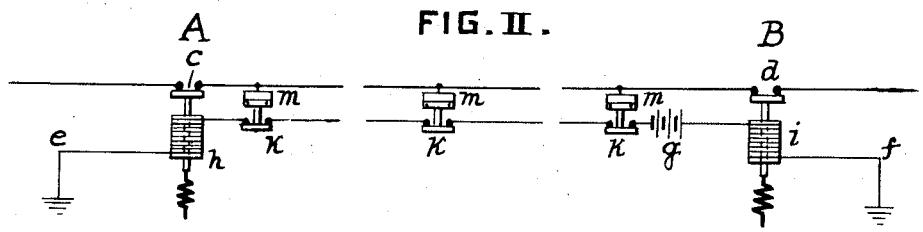
WITNESSES
INVENTORS Patented June 16, 1925.

1,541,937

UNITED STATES PATENT OFFICE.

HENRY W. FISHER AND RALPH W. ATKINSON, OF PERTH AMBOY, NEW JERSEY, ASSIGNORS TO STANDARD UNDERGROUND CABLE COMPANY, OF PITTSBURGH, PENNSYLVANIA, A CORPORATION OF PENNSYLVANIA.

CABLE INSTALLATION.

Original application filed July 3, 1920, Serial No. 393,574. Divided and this application filed December 24, 1924. Serial No. 757,906.

*To all whom it may concern:*

Be it known that we, HENRY W. FISHER and RALPH W. ATKINSON, residing at Perth Amboy, in the county of Middlesex and State of New Jersey, both citizens of the United States, have invented or discovered certain new and useful Improvements in Cable Installations, of which improvements the following is a specification.

Our invention relates to improvements in the installation of electric cables and consists in protective apparatus, whereby a length of cable containing, within and as part of its insulation, fluid under pressure, may, in case the pressure be on any account relieved, be disconnected from the circuit in which it is found, and by such disconnection be saved from injury. This application is a division from an application for Letters Patent filed by us July 3rd, 1920, Serial No. 393,574, patented Jan. 27, 1925, No. 1,524,124.

Our invention is illustrated in the accompanying drawings, in which Fig. I is a view in cross-section, showing somewhat diagrammatically a three-conductor cable of familiar general structure, and Fig. II is a diagrammatic view of a cable installation, in which our present invention is found.

Our invention is applicable, to protect from injury, either single-conductor or multiple-conductor cables. For purposes of illustration we have in Fig. I shown a multiple-conductor cable; the applicability to single-conductor cables also will, in the sequel, be apparent.

In Fig. I the individual conductors are indicated at 1. These are here shown, as though they were solid conductors, and such they may be: ordinarily, however, they will be stranded: each conductor will be composed of a bundle of relatively fine wires. About each conductor lies a wrapped-on envelope 2 of insulation. 3 is the central filler, and 4 are the laterals. These ordinarily are formed of jute. The whole is wrapped about with the belt insulation 5. 6 is the lead sheath. Such is the general structure of the solid parts of an ordinary cable. There are various modifications known to the art, and our invention contemplates the range of such variation. As we have said, the cable structure here shown and described is presented as a type merely. All that is requisite for the practice of our invention is a conductor suitably positioned within an hermetically tight casing or covering—ordinarily a lead sheath— and immediately surrounded by and insulated by a body of dielectric which in part or in whole consists of a fluid substance. This fluid substance may be liquid. Ordinarily, it will be a viscid liquid, known to the art as insulating compound; it may be gaseous, and in our application mentioned above, from which this application is a division, we contemplate a cable in which the conductor is wrapped immediately in paper insulation, which paper insulation may either be impregnated with insulating compound, and if so, it necessarily contains small and ineradicable bubbles of air and atmospheric gaseous impurities, or it may be "dry" and filled with air (or other gas) alone. In either case, we contemplate maintenance of the cable in service with the fluid component of its insulation under constantly applied super-atmospheric pressure. It will be understood then that the practice of our invention requires the presence of a cable, typically illustrated in Fig. I, whose insulation includes a fluid, solid or gaseous, or solid and gaseous, maintained under constant super-atmospheric pressure.

Ordinarily pressure will be maintained upon the gaseous component of the cable insulation by providing an air pump and an accumulator for compressed air (together with means for cleaning and drying the air). Communication will be maintained between the accumulator and the interior of the cable. Suitable check valves will be provided, to prevent accidental escape of air from the cable. Pressure may be distributed throughout the length of the cable by running a pressure supply pipe parallel with the cable (either within the cable sheath or outside) and providing ports of communication at suitable intervals.

If the insulation consist of or be filled with liquid, pressure may be maintained upon it, to compress occluded bubbles, in such manner as we have indicated for an air-filled cable, or the requisite pressure may be maintained by bringing a reservoir of liquid into communication with the liquid insulation under a sufficient hydrostatic head.

Our present invention consists in the provision of cut-out apparatus, useful in the installation of a cable characterized as above described; the cut-out apparatus operating to disconnect the cable from its source of electric current, and operated by the fall in pressure, in case a fault develops, as for instance the perforation, by any cause whatever, of the cable sheath. The cut-out apparatus may be made to operate, either by a reduction of pressure below a critical point, or by a falling of pressure at more than a critical speed.

Such pressure-operated devices will, of course, be distributed at suitable intervals throughout the length of the cable. Any suitable means may be employed for communicating the effect of operation from the remote pressure-operated device to the protective apparatus iself; for example, a wire may be included within the body of the cable (it might be external) through which, on the movement of the relay device, an electrical circuit will be closed (or opened) and, a battery or equivalent source of electric energy being included in the circuit, current will flow (or cease to flow) to operate the protective device, either directly or through a relay.

Referring now to Fig. II of the drawings, A—B indicates a cable, having the characteristics already noted. c and d are cut-outs, arranged adjacent the opposite ends of the length of cable A—B. e—f is a cut-out operating circuit, extending throughout the length of cable A—B, and including a suitable source g of electric energy. h and i are electro-magnets operated by current flowing in circuit e—f and effecting the closing and opening of the cut-outs c and d, according as they are energized or deenergized. k indicates a succession of switches, arranged in circuit e—f at suitable intervals and operated each by a fluid-pressure motor m. These motors are subjected to the pressure of the interior of the cable A—B at proper points throughout the length thereof. As shown, current flowing in circuit e—f energizes magnets h and i and maintains the cut-outs c and d in closed position. Failure of pressure (consequent on leakage, let us say) at any point will result in the operation of an adjacent motor m; the corresponding switch k will open; the circuit e—f will be broken; the electro-magnets h, i will be deenergized; cut-outs c and d will be opened; and the cable A—B will thus be instantaneously relieved of its load.

In the case of a long section of cable, many thousand feet in length, should the sheath suffer injury at one point, in consequence of which pressure escapes very rapidly, the transmission of the impulse of pressure reduction may proceed with relative slowness. It is desirable, therefore, that the switches k with their motor m be multiplied, and introduced at frequent intervals, perhaps adjacent every joint, throughout the length of the installed cable.

Throughout such a length of cable as is contemplated in the foregoing paragraph the conductor or conductors will of course be continuous, and there will be no need (so far as the present invention is concerned) to provide cut-out switches at any intermediate point in its length, but only at its ends. Such cut-out switches will be operated by the protective apparatus referred to. The insulation, however, which surrounds the continuous conductor may and conceivably will advantageously be divided into sections, each section being pneumatically separate, each separately put under pressure, and each provided with its own pressure-operated device, and every one of these devices being effective to operate the protective apparatus.

We claim as our invention:

1. A high-tension electric transmission installation including a length of cable within which fluid bodies are maintained under pressure and means in communication with said cable length operated by reduction of pressure for disconnecting said cable length from associated parts of the installation, substantially as described.

2. A high-tension electric transmission installation including a source of electric energy, a length of cable the insulation of which is filled with fluid under pressure, protective apparatus operating to disconnect the length of cable from the source of energy, a plurality of devices arranged successively along the length of cable and connected therewith and operated on diminution of pressure within the cable insulation, and operative connection from each such device to the protective apparatus, substantially as described.

3. A high-tension electric transmission installation including a source of electric energy, a length of cable the insulation of which is filled with air under pressure, protective apparatus operating to disconnect the length of cable from the source of energy, a plurality of devices arranged successively along the length of cable and connected therewith and operated on diminution of pressure within the cable insulation, and operative connection from each such device to the protective apparatus, substantially as described.

In testimony whereof we have hereunto set our hands.

HENRY W. FISHER.
RALPH W. ATKINSON.

Witnesses:
 WILLARD RANKIN,
 JOSEPHINE McINTYRE.